(12) United States Patent
Elizalde et al.

(10) Patent No.: US 8,193,271 B2
(45) Date of Patent: Jun. 5, 2012

(54) PROCESS FOR PREPARING AN AQUEOUS POLYMER COMPOSITION USING WATER-SOLUBLE FREE RADICAL CHAIN REGULATORS

(75) Inventors: Oihana Elizalde, Mannheim (DE); Matthias Gerst, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/524,616

(22) PCT Filed: Feb. 4, 2008

(86) PCT No.: PCT/EP2008/051352
§ 371 (c)(1), (2), (4) Date: Jul. 27, 2009

(87) PCT Pub. No.: WO2008/095900
PCT Pub. Date: Aug. 14, 2008

(65) Prior Publication Data
US 2010/0010143 A1    Jan. 14, 2010

(30) Foreign Application Priority Data
Feb. 7, 2007  (EP) .................................... 07101884

(51) Int. Cl.
*C08L 21/02* (2006.01)

(52) U.S. Cl. ........ 524/460; 523/201; 523/402; 523/408; 524/457; 524/458; 524/517; 524/522; 526/193; 526/201; 526/203; 526/217; 526/222; 526/224

(58) Field of Classification Search .................. 523/201, 523/408, 402; 524/457, 458, 460, 517, 522; 526/201, 203, 224, 193, 217, 222
See application file for complete search history.

(56) References Cited

U.S. PATENT DOCUMENTS

| | | | |
|---|---|---|---|
| 4,269,749 A | | 5/1981 | Marriott et al. |
| 5,714,539 A | * | 2/1998 | Perez et al. ............ 524/556 |
| 6,897,256 B1 | * | 5/2005 | Dreher et al. ............ 524/457 |
| 2005/0004309 A1 | | 1/2005 | Gerst et al. |
| 2009/0085240 A1 | | 4/2009 | Elizalde et al. |

FOREIGN PATENT DOCUMENTS

| | | |
|---|---|---|
| DE | 40 03 422 | 8/1991 |
| DE | 10 2006 001 979 | 7/2007 |
| DE | 10 2006 019 184 | 10/2007 |
| WO | 03 035778 | 5/2003 |
| WO | 2006 082223 | 8/2006 |
| WO | 2007 082819 | 7/2007 |
| WO | 2007 122089 | 11/2007 |

OTHER PUBLICATIONS

U.S. Appl. No. 12/160,683, filed Jul. 11, 2008, Elizalde et al.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

Process for preparing an aqueous polymer composition using water-soluble free radical chain regulators.

18 Claims, No Drawings

PROCESS FOR PREPARING AN AQUEOUS POLYMER COMPOSITION USING WATER-SOLUBLE FREE RADICAL CHAIN REGULATORS

The present invention relates to a process for preparing an aqueous polymer composition by free radically initiated emulsion polymerization of a monomer mixture M composed of i) from 0.01 to 10% by weight of at least one ethylenically unsaturated monomer M1 which comprises at least one epoxide group and/or at least one hydroxyalkyl group, and ii) from 90 to 99.99% by weight of at least one further ethylenically unsaturated monomer M2 which differs from the monomers M1, in an aqueous medium in the presence of a polymer A, the polymer A being composed of a) from 80 to 100% by weight of at least one ethylenically unsaturated mono- and/or dicarboxylic acid [monomers A1] and b) from 0 to 20% by weight of at least one further ethylenically unsaturated monomer which differs from the monomers A1 [monomers A2], incorporated in the form of polymerized units, and the ratio of the total amount of the monomer mixture M (total monomer amount M) to the total amount of the polymer A being from 1:99 to 99:1, wherein the polymer A has been prepared in an aqueous medium by free radically initiated polymerization of the monomers A1 and A2 in the presence of a sulfur-, nitrogen-, and/or phosphorus-containing free radical chain regulator which at 20° C. and 1 atm (=1.013 bar absolute) in demineralized water has a solubility of $\geq 5$ g/100 g of water.

The present invention likewise relates to the use of this aqueous polymer composition as a binder in the production of adhesives, sealants, shaped articles made from fibrous or particulate substrates, polymeric renders, paper coating compositions, and paints, and for impregnating base papers, and also for modifying mineral binders or plastics.

The unpublished German patent application with the file reference DE 102006001979.2 discloses the use of an aqueous polymer composition, comprising a polyacid and an epoxy or hydroxyalkyl group functionalized addition polymer, to impregnate base paper. The likewise unpublished German patent application with the file reference DE 102006019184.6 discloses the use of an aqueous polymer composition, comprising a polyacid and an epoxy or hydroxyalkyl group functionalized addition polymer, as a binder for fibrous or particulate substrates.

It was an object of the present invention to provide an improved process for preparing an aqueous polymer composition, comprising a polyacid and an epoxy or hydroxyalkyl group functionalized addition polymer.

Accordingly, the process defined at the outset was found.

The procedure for free radically initiated emulsion polymerizations of ethylenically unsaturated monomers in an aqueous medium has been widely described in the past and is therefore sufficiently well known to the person skilled in the art [cf. in this context Emulsion polymerization in Encyclopedia of Polymer Science and Engineering, vol. 8, page 659 et seq. (1987); D. C. Blackley, in High Polymer Latices, vol. 1, page 35 et seq. (1966); H. Warson, The Applications of Synthetic Resin Emulsions, chapter 5, page 246 et seq. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. The free radically initiated aqueous emulsion polymerization reactions are usually effected in such a way that the ethylenically unsaturated monomers are dispersed with the concomitant use of dispersants in the aqueous medium and in the form of monomer droplets and are polymerized by means of a free radical polymerization initiator. The present process according to the invention for preparing an aqueous polymer composition differs from the known prior art in that the monomer mixture M is subjected to free radical polymerization in the presence of a polymer A which has been prepared using a specific free radical chain regulator.

The aqueous polymer composition is prepared using clear water, preferably drinking water and with particular preference demineralized water, the total amount of which is such that it amounts to from 30 to 90% by weight and advantageously from 40 to 60% by weight, based in each case on the aqueous polymer composition.

According to the invention, a polymer A is used which is composed of a) from 80 to 100% by weight of at least one monomer A1 and b) from 0 to 20% by weight of at least one monomer A2 incorporated in the form of polymerized units, and which has been prepared in an aqueous medium by free radically initiated polymerization of the monomers A1 and A2 in the presence of a sulfur-, nitrogen-, and/or phosphorous-containing free radical chain regulator which at 20° C. and 1 atm in demineralized water has a solubility $\geq 5$ g/100 g of water.

Suitable monomers A1 are in particular $\alpha,\beta$-monoethylenically unsaturated mono- and dicarboxylic acids which have 3 to 6 carbon atoms, possible anhydrides thereof and water-soluble salts thereof, in particular alkali metal salts thereof, such as, for example, acrylic acid or methacrylic acid, maleic acid, fumaric acid, itaconic acid, citraconic acid, tetrahydrophthalic acid and the anhydrides thereof, such as, for example, maleic anhydride, and the sodium or potassium salts of the abovementioned acids. Acrylic acid, methacrylic acid and/or maleic anhydride are particularly preferred, acrylic acid being especially preferred.

For the preparation of the polymer A used according to the invention, in particular ethylenically unsaturated compounds which can be subjected to free radical copolymerization with monomer A1 in a simple manner are suitable as at least one monomer A2, such as, for example, ethylene, vinyl aromatic monomers, such as styrene, $\alpha$-methylstyrene, o-chlorostyrene or vinyltoluenes, vinyl halides, such as vinyl chloride or vinylidene chloride, esters of vinyl alcohol and monocarboxylic acids having 1 to 18 carbon atoms, such as vinyl acetate, vinyl propionate, vinyl n-butyrate, vinyl laurate and vinyl stearate, esters of $\alpha,\beta$-monoethylenically unsaturated mono- and dicarboxylic acids having preferably 3 to 6 carbon atoms, such as, in particular, acrylic acid, methacrylic acid, maleic acid, fumaric acid and itaconic acid, with alkanols having in general 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butyl fumarate and maleate, nitriles of $\alpha,\beta$-monoethylenically unsaturated carboxylic acids, such as acrylonitrile, methacrylonitrile, fumarodinitrile, maleodinitrile, and $C_{4-8}$ conjugated dienes, such as 1,3-butadiene (butadiene) and isoprene. Said monomers are as a rule the main monomers which, based on the total amount of monomers A2, together account for a proportion of $\geq 50\%$ by weight, preferably $\geq 80\%$ by weight and particularly preferably $\geq 90\%$ by weight or even constitute the total amount of the monomers A2. As a rule, these monomers have only a moderate to low solubility in water under standard temperature and pressure conditions [20° C., 1 atm (absolute)].

Monomers A2 which have a high water solubility under the abovementioned conditions are those which comprise either at least one sulfo group and/or the corresponding anion thereof or at least one amino, amido, ureido or N-heterocyclic group and/or the ammonium derivatives thereof which are alkylated or protonated on the nitrogen. Acrylamide and methacrylamide and furthermore vinylsulfonic acid, 2-acrylamido-2-methylpropanesulfonic acid, styrenesulfonic acid and the water-soluble salts thereof and N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide and 2-(1-imidazolin-2-onyl)ethyl methacrylate may be mentioned by way of example. Usually, the abovementioned water-soluble monomers A2 are present only as modifying monomers in amounts of $\leq$10% by weight, preferably $\leq$5% by weight and particularly preferably $\leq$3% by weight, based on the total amount of monomers A2.

Monomers A2, which usually increase the internal strength of the films of a polymer matrix, usually have at least one epoxy, hydroxyl, N-methylol or carbonyl group or at least two nonconjugated ethylenically unsaturated double bonds. Examples of these are monomers having two vinyl radicals, monomers having two vinylidene radicals and monomers having two alkenyl radicals. Particularly advantageous are the diesters of dihydric alcohols with α,β-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinyl benzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Also of particular importance in this context are $C_1$-$C_8$-hydroxyalkyl methacrylates and acrylates, such as n-hydroxyethyl, n-hydroxypropyl or n-hydroxybutyl acrylate and methacrylate, and compounds such as diacetoneacrylamide and acetylacetoxyethyl acrylate or methacrylate. Frequently, the above-mentioned crosslinking monomers A2 are used in amounts of $\leq$10% by weight, but preferably in amounts of $\leq$5% by weight, based in each case on the total amount of monomers A2. Particularly preferably however, no such crosslinking monomers A2 at all are used for the preparation of the polymer A.

Advantageously, monomer mixtures which comprise
from 50 to 100% by weight of esters of acrylic and/or methacrylic acid with alkanols having 1 to 12 carbon atoms, or
from 50 to 100% by weight of styrene and/or butadiene, or
from 50 to 100% by weight of vinyl chloride and/or vinylidene chloride, or
from 40 to 100% by weight of vinyl acetate, vinyl propionate and/or ethylene
are used as monomers A2 for the preparation of the polymer A.

According to the invention, the proportion of monomers A2 incorporated in the form of polymerized units in the polymer A is advantageously $\leq$10% by weight or $\leq$5% by weight. Particularly advantageously, the polymer A comprises no monomers A2 at all incorporated in the form of polymerized units.

The polymers A employed are prepared, according to the invention, by free radically initiated polymerization of the monomers A in an aqueous medium in the presence of a sulfur-, nitrogen-, and/or phosphorous-containing free radical chain regulator which at 20° C. and 1 atm in demineralized water has a solubility $\geq$5 g/100 g of water.

The preparation of polymers A is familiar in its principle to the person skilled in the art (cf. for example A. Echte, Handbuch der Technischen Polymerchemie, chapter 6, VCH, Weinheim, 1993 or B. Vollmert, Grundriss der Makromolekularen Chemie, volume 1, E. Vollmert Verlag, Karlsruhe, 1988).

Sulfur-containing free radical chain regulators used are, for example, mercaptoalkanols, such as 2-mercaptoethanol, 2-mercaptopropanol or 3-mercaptopropanol, alkali metal hydrogen sulfites, such as sodium hydrogen sulfite or potassium hydrogen sulfite, and also thiosulfuric acid and the alkali metal salts thereof, or 3-mercapto-2-aminopropanoic acid (cysteine); nitrogen-containing free radical chain regulators used are, for example, hydroxylamine(ammonium) compounds, such as hydroxylammonium sulfate; and phosphorus-containing free radical chain regulators used are, for example, phosphorous acid, hypophosphorous acid, metaphosphorous acid, orthophosphoric acid, pyrophosphoric acid or polyphosphoric acid and the alkali metal salts thereof, more particularly the sodium or potassium salts thereof, advantageously sodium hypophosphite or sodium dihydrogen phosphate.

It is essential to the invention that the sulfur-, nitrogen-, and/or phosphorus-containing free radical chain regulators, at 20° C. and 1 atm in demineralized water, have a solubility $\geq$5 g, advantageously $\geq$10 g and particularly advantageously $\geq$20 g per 100 g of water.

With particular advantage the free radical chain regulator is selected from hypophosphorous acid and the alkali metal salts thereof, more particularly sodium hypophosphite, alkali metal hydrogen sulfites, more particularly sodium hydrogen sulfite, hydroxylammonium sulfate and/or 2-mercaptoethanol.

In the preparation of the polymer A it is advantageous for the amount of the sulfur-, nitrogen-, and/or phosphorus-containing free radical chain regulator to be selected such that the weight average molecular weight of the polymer A is $\geq$1000 g/mol and $\leq$20 000 g/mol and more particularly $\geq$2000 g/mol and $\leq$15 000 g/mol. The required amount of the free radical chain regulator and the corresponding polymerization conditions are known to the person skilled in the art or can be determined by him or her in simple routine experiments. According to the invention the polymer A can be used in the form of its aqueous solution or in the form of its solid as obtained by drying (freeze drying or spray drying, for example). With particular advantage the polymer A is used in the form of its aqueous solution obtained in the course of the preparation.

The weight average molecular weights of the addition polymers A are determined, in a manner familiar to the person skilled in the art, according to DIN 55672-1, by means of gel permeation chromatography (for example, linear column: Supremea M from PSS, eluent: 0.08 mol/l TRIS buffer pH 7.0, demineralized water, liquid flow rate: 0.8 ml/min, detector: differential refractometer ERC 7510 from ERC, internal standard/calibration substance: polyacrylic acid sodium salt).

According to the invention, it is possible in the preparation of the aqueous polymer composition, if appropriate, initially to take a portion or the total amount of polymer A in the polymerization vessel. However, it is also possible to meter in the total amount or any remaining residual amount of polymer A during the polymerization reaction of the monomer mixture M. The total amount or any remaining residual amount of polymer A can be metered into the polymerization vessel batchwise in one or more portions or continuously with constant or varying flow rates. Advantageously, the total amount of polymer A is initially taken before initiating the polymerization reaction of the monomer mixture M in the polymerization vessel. With particular advantage the polymer A is prepared in situ in the polymerization vessel for the polymerization of the monomer mixture M.

In the process according to the invention for the preparation of the aqueous polymer composition, dispersants which keep both the monomer droplets and the polymer particles obtained by the free radically initiated polymerization of the monomer mixture M dispersed in the aqueous phase and thus ensure the stability of the aqueous polymer composition produced are frequently concomitantly used. Both the protective colloids usually used for carrying out aqueous free radical emulsion polymerizations and emulsifiers are suitable as such.

Suitable protective colloids are, for example, polyvinyl alcohols, cellulose derivatives or copolymers comprising vinylpyrrolidone. A detailed description of further suitable protective colloids is to be found in Houben-Weyl, Methoden der organischen Chemie, volume XIV/1, Makromolekulare Stoffe, pages 411 to 420, Georg-Thieme-Verlag, Stuttgart, 1961. Since the polymer A used according to the invention can also act as a protective colloid, advantageously no additional protective colloids are used according to the invention.

Of course, mixtures of emulsifiers and/or protective colloids may also be used. Frequently, exclusively emulsifiers whose relative molecular weight, in contrast to the protective colloids, is usually below 1000 g/mol are used as dispersants. They may be either anionic, cationic or nonionic. Of course in the case of the use of mixtures of surface-active substances, the individual components must be compatible with one another, which in case of doubt can be checked by means of a few preliminary experiments. In general, anionic emulsifiers are compatible with one another and with nonionic emulsifiers. The same also applies to cationic emulsifiers, whereas anionic and cationic emulsifiers are generally not compatible with one another.

Customary emulsifiers are, for example, ethoxylated mono-, di- and trialkylphenols (degree of ethoxylation: 3 to 50, alkyl radical: $C_4$ to $C_{12}$), ethoxylated fatty alcohols (degree of ethoxylation: 3 to 50; alkyl radical: $C_8$ to $C_{36}$) and alkali metal and ammonium salts of alkyl sulfates (alkyl radical: $C_8$ to $C_{12}$), or sulfuric monoesters of ethoxylated alkanols (degree of ethoxylation: 3 to 30, alkyl radical: $C_{12}$ to $C_{18}$) and ethoxylated alkylphenols (degree of ethoxylation: 3 to 50, alkyl radical: $C_4$ to $C_{12}$), of alkanesulfonic acids (alkyl radical: $C_{12}$ to $C_{18}$) and of alkylarylsulfonic acids (alkyl radical: $C_9$ to $C_{18}$). Further suitable emulsifiers are to be found in Houben-Weyl, Methoden der organischen Chemie, volume XIV/1, Makromolekulare Stoffe, pages 192 to 208, Georg-Thieme-Verlag, Stuttgart, 1961.

Compounds of the general formula I

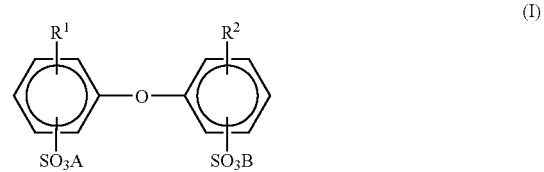

where $R^1$ and $R^2$ are $C_4$- to $C_{24}$-alkyl and one of the radicals $R^1$ or $R^2$ may also be hydrogen, and A and B may be alkali metal ions and/or ammonium ions, have furthermore proven suitable as surface-active substances. In the general formula I, $R^1$ and $R^2$ are preferably linear or branched alkyl radicals having 6 to 18 carbon atoms, in particular having 6, 12 or 16 carbon atoms, or H atoms, $R^1$ and $R^2$ not both simultaneously being H atoms. A and B are preferably sodium, potassium or ammonium ions, sodium ions being particularly preferred. Compounds I in which A and B are sodium ions, $R^1$ is a branched alkyl radical having 12 carbon atoms and $R^2$ is an H atom or $R^1$ are particularly advantageous. Industrial mixtures which have a proportion of from 50 to 90% by weight of the monoalkylated product are frequently used, for example Dowfax® 2A1 (brand of Dow Chemical Company). The compounds I are generally known, for example from U.S. Pat. No. 4,269,749, and are commercially available.

Nonionic and/or anionic emulsifiers are preferably used for the process according to the invention.

As a rule, the amount of additionally used dispersant, in particular emulsifiers, is from 0.1 to 5% by weight, preferably from 1 to 3% by weight, based in each case on the total amount of the monomer mixture M.

According to the invention, it is possible initially to take, if appropriate, a portion or the total amount of dispersant in the polymerization vessel as a constituent of the aqueous medium comprising the polymer A. However, it is also possible to meter in the total amount or any remaining residual amount of dispersant during the polymerization reaction of the monomer mixture M. The total amount or any remaining residual amount of dispersant can be metered into the polymerization vessel batchwise in one or more portions or continuously with constant or varying flow rates. Particularly advantageously, the metering of the dispersants during the polymerization reaction is effected continuously with constant flow rates, in particular as a constituent of an aqueous monomer emulsion.

The monomer mixture M used according to the invention is composed of
i) from 0.01 to 10% by weight of at least one ethylenically unsaturated monomer M1 which comprises at least one epoxide group and/or at least one hydroxyalkyl group, and
ii) from 90 to 99.99% by weight of at least one further ethylenically unsaturated monomer M2 which differs from the monomers M1.

According to the invention the monomer mixture M can be used in the form of its separate individual components, monomers M1 and monomers M2, in the form for example of separate individual streams, and also in the form of a homogeneous mixture of the monomers M1 and M2, in the form for example of a homogeneous monomer emulsion.

Particularly suitable monomers M1 are glycidyl acrylate and/or glycidyl methacrylate and hydroxyalkyl acrylates and methacrylates having $C_2$- to $C_{10}$-hydroxyalkyl groups, in particular $C_2$- to $C_4$-hydroxyalkyl groups and preferably $C_2$- and $C_3$-hydroxyalkyl groups. 2-Hydroxyethyl acrylate, 2-hydroxyethyl methacrylate, 3-hydroxypropyl acrylate, 3-hydroxypropyl methacrylate, 4-hydroxybutyl acrylate and/or 4-hydroxybutyl methacrylate may be mentioned by way of example. Particularly advantageously, however, glycidyl acrylate and/or glycidyl methacrylate is used as monomer M1, glycidyl methacrylate being particularly preferred.

According to the invention, it is possible, if appropriate, initially to take a portion or the total amount of monomers M1 in the polymerization vessel. However, it is also possible to meter in the total amount or any remaining residual amount of monomers M1 during the polymerization reaction. The total amount or any remaining residual amount of monomers M1 can be metered into the polymerization vessel batchwise in one or more portions or continuously with constant or varying flow rates. Particularly advantageously, the metering of the monomers M1 during the polymerization reaction is effected continuously with constant flow rates, in particular as a constituent of an aqueous monomer emulsion.

In particular, ethylenically unsaturated compounds which can be subjected to free radical copolymerization in a simple manner with monomer M1, such as, for example, ethylene, vinylaromatic monomers, such as styrene, α-methylstyrene, o-chlorostyrene or vinyltoluenes, vinyl halides, such as vinyl chloride or vinylidene chloride, esters of vinyl alcohol and monocarboxylic acids having 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids having preferably 3 to 6 carbon atoms, such as, in particular, acrylic acid, methacrylic acid, maleic acid, fumaric acid and itaconic acid, with alkanols having in general 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butyl fumurate and maleate, nitriles of α,β-monoethylenically unsaturated carboxylic acids, such as acrylonitrile, methacrylonitrile, fumarodinitrile, maleodinitrile, and $C_{4-8}$-conjugated dienes, such as 1,3-butadiene (butadiene) and isoprene, are suitable as at least one monomer M2 for the preparation of the aqueous polymer compositions according to the invention. Said monomers are as a rule the main monomers which, based on the total amount of monomers M2, together account for a proportion of $\geq 50\%$ by weight, preferably $\geq 80\%$ by weight and particularly $\geq 90\%$ by weight. As a rule, these monomers have only a moderate to low solubility in water under standard temperature and pressure conditions [20° C., 1 atm (absolute)].

Monomers M2 which have a high water solubility under the abovementioned conditions are those which comprise either at least one acid group and/or the corresponding anion thereof or at least one amino, amido, ureido or n-heterocyclic group and/or the ammonium derivatives thereof which are alkylated or protonated on the nitrogen. α,β-monoethylenically unsaturated mono- and dicarboxylic acids having 3 to 6 carbon atoms and the amides thereof, such as, for example, acrylic acid, methacrylic acid, maleic acid, fumaric acid, itaconic acid, acrylamide and methacrylamide, and furthermore vinylsulfonic acid, 2-acrylamido-2-methylpropanesulfonic acid, styrenesulfonic acid and the water-soluble salts thereof and N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate may be mentioned by way of example. Usually, the abovementioned water-soluble monomers M2 are present only as modifying monomers in amounts of $\leq 10\%$ by weight, preferably $\leq 5\%$ by weight and particularly preferably $\leq 3\%$ by weight, based on the total amount of monomers M2.

Monomers M2, which usually increase the internal strength of the films of a polymer matrix, usually have at least one N-methylol or carbonyl group or at least two nonconjugated ethylenically unsaturated double bonds. Examples of these are monomers having two vinyl radicals, monomers having two vinylidene radicals and monomers having two alkenyl radicals. The diesters of dihydric alcohols with α,β-monoethylenically unsaturated monocarboxylic acids are particularly advantageous, and among these acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. In this context compounds such as diacetoneacrylamide and acetylacetoxyethyl acrylate or methacrylate are also of importance. Frequently, the abovementioned crosslinking monomers M2 are used in amounts of $\leq 10\%$ by weight, preferably in amounts of $\leq 5\%$ by weight and particularly preferably in amounts of $\leq 3\%$ by weight, based in each case on the total amount of monomers M2. Frequently, however, no such crosslinking monomers M2 at all are used.

According to the invention those monomer mixtures which comprise from 50 to 99.9% by weight of esters of acrylic and/or methacrylic acid with alkanols having 1 to 12 carbon atoms, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate and/or ethylene are advantageously used as monomers M2.

According to the invention, those monomer mixtures which comprise from 0.1 to 5% by weight of at least one α,β-monoethylenically unsaturated mono- and/or dicarboxylic acid having 3 to 6 carbon atoms and/or the amide thereof and from 50 to 99.9% by weight of at least one ester of acrylic and/or methacrylic acid with alkanols having 1 to 12 carbon atoms, or from 0.1 to 5% by weight of at least one α,β-monoethylenically unsaturated mono- and/or dicarboxylic acid having 3 to 6 carbon atoms and/or the amide thereof and from 50 to 99.9% by weight of styrene and/or butadiene, or from 0.1 to 5% by weight of at least one α,β-monoethylenically unsaturated mono- and/or dicarboxylic acid having 3 to 6 carbon atoms and/or the amide thereof and from 50 to 99.9% by weight of vinyl chloride and/or vinylidene chloride, or from 0.1 to 5% by weight of at least one α,β-monoethylenically unsaturated mono- and/or dicarboxylic acid having 3 to 6 carbon atoms and/or the amide thereof and from 40 to 99.9% by weight of vinyl acetate, vinyl propionate and/or ethylene are particularly advantageously used as monomers M2.

According to the invention, it is possible, if appropriate, initially to take a portion or the total amount of monomers M2 in the polymerization vessel. However, it is also possible to meter in the total amount or any remaining residual amount of monomers M2 during the polymerization reaction. The total amount or any remaining residual amount of monomers M2 can be metered into the polymerization vessel batchwise in one or more portions or continuously with constant or varying flow rates. Particularly advantageously the metering of the monomers M2 during the polymerization reaction is effected continuously with constant flow rates, in particular as a constituent of an aqueous monomer emulsion.

Advantageously, the monomers M1 and M2 are used together as monomer mixture M, more particularly in the form of an aqueous monomer emulsion.

According to the invention, advantageously used monomer mixtures M are those whose total content of monomers M1 is from 0.1% by weight to 5% by weight and in particular from 0.5% by weight to 3% by weight, and accordingly the total amount of monomers M2 is from 95% by weight to 99.9% by weight and in particular from 97% by weight to 99.5% by weight.

The free radically initiated polymerization reaction of the monomer mixture M is initiated by means of a free radical polymerization initiator familiar to the person skilled in the art for the aqueous emulsion polymerization (free radical initiator). Said initiators can in principle be both peroxides and azo compounds. Of course, redox initiator systems are also suitable. Peroxides which may be used are in principle inorganic peroxides, such as hydrogen peroxide, or peroxodisulfates, such as the mono- or di-alkali metal or ammonium salts of peroxodisulfuric acid, such as, for example, the mono- and disodium, mono- and dipotassium or ammonium salts thereof, or organic peroxides, such as alkyl hydroperoxides, for example tert-butyl, p-menthyl or cumyl hydroperoxide, and dialkyl or diaryl peroxides, such as di-tert-butyl or di-cumyl peroxide. 2,2'-Azobis(isobutyronitrile), 2,2'-azobis (2,4-dimethylvaleronitrile) and 2,2'-azobis(amidinopropyl) dihydrochloride (AIBA, corresponds to V-50 from Wako Chemicals) are substantially used as the azo compound. Suitable oxidizing agents for redox initiator systems are substantially the abovementioned peroxides. Sulfur compounds having a low oxidation state, such as alkali metal sulfites, for example potassium and/or sodium sulfite, alkali metal hydrogen sulfites, for example potassium and/or sodium hydrogen sulfite, alkali metal metabisulfites, for example potassium and/or sodium metabisulfite, formaldehyde sulfoxylates, for example potassium and/or sodium formaldehyde sulfoxylate, alkali metal salts, especially potassium and/or sodium salts, of aliphatic sulfinic acids, and alkali metal hydrogen sulfides, such as, for example, potassium and/or sodium hydrogen sulfide, salts of polyvalent metals, such as iron(II) sulfate, iron(II) ammonium sulfate or iron(II) phosphate, enediols, such as dihydroxymaleic acid, benzoin and/or ascorbic acid, and reducing saccharides, such as sorbose, glucose, fructose and/or dihydroxyacetone, can be used as corresponding reducing agents. As a rule, the amount of the free radical initiator used, based on the total amount of monomer mixture M, is from 0.01 to 5% by weight, preferably from 0.1 to 3% by weight and particularly preferably from 0.2 to 1.5% by weight. Where compounds are used both as free radical chain regulators and as reducing agents in a redox initiator system, the amount in which they are used is increased accordingly.

According to the invention, it is possible, if appropriate, initially to take a portion or the total amount of free radical initiator in the polymerization vessel. However, it is also possible to meter in the total amount or any remaining residual amount of free radical initiator during the polymerization reaction. The total amount or any remaining residual amount of free radical initiator can be metered into the polymerization vessel batchwise in one or more portions or continuously with constant or varying flow rates. Particularly advantageously, the metering of the free radical initiator during the polymerization reaction is effected continuously with constant flow rate—in particular in the form of an aqueous solution of the free radical initiator. Where reducing agents are used as free radical chain regulators, it should be ensured that, in the context of the use thereof as a component in a redox initiator system, it is always present in an excess in relation to the oxidizing agent.

The polymerization reaction is initiated under temperature and pressure conditions under which the free radically initiated aqueous emulsion polymerization of the monomer mixture M takes place at a sufficient polymerization rate; it is dependent in particular on the free radical initiator used. Advantageously, the type and amount of the free radical initiator, polymerization temperature and polymerization pressure are selected so that the free radical initiator has a half life of $\leq 3$ hours, particularly advantageously $\leq 1$ hour and very particularly advantageously $\leq 30$ minutes, and there are always sufficient free radicals present to initiate and maintain the free radical polymerization. If necessary, the nature and amount of the free radical initiator, and the polymerization temperature and polymerization pressure, can be determined by a person skilled in the art, in simple preliminary experiments.

Depending on the free radical initiator chosen, the total range of from 0 to 170° C. is suitable as a reaction temperature for the free radically initiated polymerization reaction according to the invention of the monomer mixture M. As a rule, temperatures of from 50 to 120° C., in particular from 60 to 110° C. and advantageously from 70 to 100° C. are used. The free radically initiated polymerization reaction according to the invention can be carried out at a pressure of less than, equal to or greater than 1 atm, so that the polymerization temperature may exceed 100° C. and may be up to 170° C. Preferably readily volatile monomers such as, for example, ethylene, butadiene or vinyl chloride are polymerized under superatmospheric pressure. The pressure may be 1.2, 1.5, 2, 5, 10 or 15 bar (absolute) or may assume even higher values. If polymerization reactions are carried out under reduced pressure, pressures of 950 mbar, frequently of 900 mbar and often of 850 mbar (absolute) are established. Advantageously, the free radically initiated polymerization according to the invention is carried out at 1 atm (absolute) under an inert gas atmosphere, such as, for example, under nitrogen or argon.

As a rule, the process according to the invention is advantageously effected in a manner such that at least a portion of the demineralized water used and, if appropriate, a portion of the free radical initiator and of the monomer mixture M and the total amount of the polymer A are initially taken in a polymerization vessel at from 20 to 25° C. (room temperature) and atmospheric pressure under an inert gas atmosphere, the initially taken mixture is then heated to the suitable polymerization temperature with stirring, and any remaining residual amount or the total amount of free radical initiator and monomer mixture M is then metered into the polymerization mixture.

According to the invention, the emulsion polymerization of the monomer mixture M is effected in an aqueous medium in the presence of a polymer A, the ratio of the total monomer amount M to the total amount of the polymer A being from 1:99 to 99:1, often from 10:90 to 90:10, advantageously from 20:80 to 80:20 and particularly advantageously from 40:60 to 60:40.

The aqueous reaction medium can in principle also comprise small amounts of water-soluble organic solvents, such as, for example, methanol, ethanol, isopropanol, butanols, pentanols, but also acetone, etc. However, the process according to the invention is preferably carried out in the absence of such solvents.

By a specific variation of the type and amount of the monomers M1 and M2, it is possible, according to the invention, for the person skilled in the art to prepare aqueous polymer compositions whose polymers M, composed of the monomers M1 and M2 incorporated in the form of polymerized units, have a glass transition temperature or a melting point in the range from −60 to 270° C. Glass transition temperature and melting point of the polymer M are to be understood in the context of this document as meaning that glass transition temperature or that melting point which the polymer obtained on polymerization of the monomer mixture M alone, i.e. polymerization in the absence of the polymer A, would have. According to the invention, the glass transition temperature of the polymer M is advantageously from $\geq -20°$ C. to $\leq 105°$ C. and preferably from $\geq 20°$ C. to $\leq 100°$ C.

The glass transition temperature $T_g$ means the limit of the glass transition temperature to which the glass transition temperature tends with increasing molecular weight, according to G. Kanig (Kolloid-Zeitschrift & Zeitschrift für Polymere, vol. 190, page 1, equation 1). The glass transition temperature or the melting point is determined by the DSC method (differential scanning calorimetry, 20 K/min, midpoint measurement, DIN 53765).

According to Fox (T. G. Fox, Bull. Am. Phys. Soc. 1956 [Ser. II] 1, page 123 and according to Ullmanns Encyclopädie der technischen Chemie, vol. 19, page 18, 4$^{th}$ edition, Verlag Chemie, Weinheim, 1980) the following is a good approximation for the glass transition temperature of at most weakly crosslinked copolymers:

$$1/T_g = x^1/T_g^1 + x^2/T_g^2 + \ldots x^n/T_g^n,$$

where $x^1, x^2, \ldots x^n$ are the mass fractions of the monomers 1, 2 $\ldots$ n and $T_g^1, T_g^2, \ldots T_g^n$ are the glass transition temperatures of the polymers composed in each case only of one of the monomers 1, 2, $\ldots$ n, in degrees Kelvin. The $T_g$ values for the homopolymers of most monomers are known and are mentioned, for example, in Ullmann's Encyclopedia of Industrial Chemistry, part 5, vol. A21, page 169, VCH Weinheim, 1992; other sources of glass transition temperatures of homopolymers are, for example, J. Brandrup, E. H. Immergut, Polymer Handbook, 1$^{st}$ ed., J. Wiley, New York 1966, 2$^{nd}$ ed., J. Wiley, New York 1975, and 3$^{rd}$ ed., J. Wiley, New York 1989.

The aqueous polymer compositions obtainable by the process according to the invention often comprise polymer compositions (corresponding to polymer A, polymer M and polymer A grafted with polymer M) whose minimum film formation temperature MFT is from $\geq 10°$ C. to $\leq 70°$ C., frequently from $\geq 20°$ C. to $\leq 60°$ C. or preferably from $\geq 25°$ C. to $\leq 50°$ C. Since the MFT is no longer measurable below 0° C., the lower limit of the MFT can be stated only by means of the $T_g$ values. The MFT is determined according to DIN 53787.

The aqueous polymer compositions obtained according to the invention usually have polymer solids contents (sum of total amount of polymer A and total amount of monomer mixture M) of $\geq 10$ and $\leq 70\%$ by weight, frequently $\geq 20$ and $\leq 65\%$ by weight and often $\geq 40$ and $\leq 60\%$ by weight, based in each case on the aqueous polymer composition.

The number average particle diameter determined by quasielastic light scattering (ISO standard 13321) (cumulant z-average) is as a rule from 10 to 2000 nm, frequently from 20 to 1000 nm and often from 50 to 700 nm or from 80 to 400 nm.

According to the invention, further optional assistants familiar to the person skilled in the art, such as, for example, so-called thickeners, antifoams, neutralizing agents, buffer substances, preservatives, free radical chain-transfer compounds and/or inorganic fillers, can also be used in the preparation of the aqueous polymer composition.

The aqueous polymer compositions prepared by the abovementioned process are suitable in particular as binders in the production of adhesives, sealants, shaped articles made from fibrous or particulate substrates, polymeric renders, paper coating compositions, and paints, and for impregnating base papers, and also for modifying mineral binders or plastics.

With particular advantage the aqueous polymer compositions according to the invention are suitable for modifying mineral binders.

The invention is to be explained in more detail with reference to the following nonlimiting examples.

EXAMPLES

Example 1

In a 5 l tank with anchor stirrer and nitrogen connection, the initial charge was heated to 95° C. under a nitrogen atmosphere with stirring. After it had reached the temperature, 138.5 g of feed 2 were added rapidly, and 5 minutes were allowed to elapse. Thereafter, beginning simultaneously, feed 1 and the remainder of feed 2 were metered in at a uniform rate over the course of 1.5 hours, after which polymerization was continued for 1 hour. Subsequently the temperature was cooled to 80° C. and, with feed 3, the mixture was adjusted to a pH of 3. The polyacrylic acid thus prepared had a weight average molecular weight Mw of 9300 g/mol.

The aforementioned aqueous polyacrylic acid solution was admixed with 13 g of feed 5 and 11.9 g of feed 6 in one portion, and 5 minutes were allowed to elapse. Thereafter, beginning simultaneously, feed 4 was metered in at a uniform rate over the course of 2 hours, and the remainders of feeds 5 and 6 were metered in at a uniform rate over the course of 2.5 hours. After the end of feeds 5 and 6, polymerization was continued for 45 minutes. Thereafter the temperature was cooled from 80° C. to 75° C. and, beginning simultaneously, feeds 7 and 8 were metered in at a uniform rate over a period of 60 minutes. Thereafter the batch was cooled to room temperature and the aqueous polymer dispersion obtained was filtered through a 125 μm mesh.

Initial Charge:
460 g deionized water
Feed 1:
228 g deionized water
650 g acrylic acid
59.5 g a 50% strength by weight aqueous solution of hypophosphorous acid
Feed 2:
214 g deionized water
16.2 g sodium persulfate
Feed 3:
65.0 g a 50% strength by weight aqueous solution of sodium hydroxide Feed 4:
308 g deionized water
13.9 g a 28% strength by weight aqueous solution of sodium lauryl ether sulfate (Texapon® NSO from Cognis Deutschland GmbH)
19.5 g glycidyl methacrylate
371 g styrene
260 g methyl methacrylate
Feed 5:
65.0 g a 10% strength by weight aqueous solution of tert-butyl hydroperoxide
Feed 6:
59.5 g a 13.1% strength by weight aqueous solution of acetone bisulfite (1:1 adduct of acetone and sodium hydrogen sulfite)
Feed 7:
26.0 g a 10% strength by weight aqueous solution of tert-butyl hydroperoxide
Feed 8:
31.8 g a 13.1% strength by weight aqueous solution of acetone bisulfite This gave an aqueous polymer dispersion having a pH of 2.5 and a solids content of 49.5% by weight. The viscosity of the aqueous polymer dispersion was 125 mPas. The LT value was found to be 54%.

The solids content was generally determined by drying a sample of about 1 g in a through-circulation drying oven for two hours at 120° C. In each case two separate measurements were carried out. The values stated in the examples are mean values of the two measured results.

The viscosity was generally determined using a Rheomat from Physica at a shear rate of 250 s$^{-1}$ according to DIN 53019 at 23° C.

The pH was generally determined using a Handylab 1 pH meter from Schott, at room temperature.

The determination of the weight average molecular weight of the polymer A was generally effected by means of gel permeation chromatography (linear column: Supremea M from PSS, eluent: 0.08 mol/l TRIS buffer pH 7.0, demineralized water, liquid flow rate: 0.8 ml/min, detector: differential refractometer ERC 7510 from ERC; internal standard: polyacrylic acid sodium salt).

The LT value was generally carried out by means of the aqueous polymer dispersion diluted to 0.01% by weight, by means of a DR/2010 Spectrometer from Hach. The standard used was demineralized water.

Example 2

In a 5 l tank with anchor stirrer and nitrogen connection, the initial charge was heated to 95° C. under a nitrogen atmosphere with stirring. Thereafter, beginning simultaneously, feed 1 was metered in at a uniform rate over the course of 1.5 hours, feed 2 over the course of 1.75 hours, and feed 3 over the course of 1.25 hours. After the end of feed 2, polymerization was continued for 0.5 hour. Thereafter feed 4 was added in one shot and the temperature was lowered to 80° C. The polyacrylic acid thus prepared had a weight average molecular weight Mw of 6100 g/mol.

The aforementioned aqueous polyacrylic acid solution was admixed with 32.5 g of feed 6 and 24.8 g of feed 7 at 80° C., each in one shot, and 5 minutes were allowed to elapse. Thereafter, beginning simultaneously, the total amount of feed 5 was metered in at a uniform rate over the course of 2 hours, and the remainders of feeds 6 and 7 were metered in at a uniform rate over the course of 2.25 hours. After the end of feeds 6 and 7, polymerization was continued for 45 minutes.

Thereafter the temperature was cooled from 80° C. to 75° C. and, beginning simultaneously, feeds 8 and 9 were metered in at a uniform rate over a period of 60 minutes. Subsequently, in order to reduce the odor, feed 10 was metered in over the course of 30 minutes, and the batch was stirred at this temperature for a further 30 minutes, with cooling at the end. Thereafter the batch was cooled to room temperature and the aqueous polymer dispersion obtained was filtered through a 125 μm mesh.
Initial Charge:
249 g deionized water
Feed 1:
320 g deionized water
650 g acrylic acid
Feed 2:
216 g deionized water
16.2 g sodium persulfate
Feed 3:
46.4 g deionized water
35.2 g 2-mercaptoethanol
Feed 4:
104 g a 50% strength by weight aqueous solution of sodium hydroxide
Feed 5:
260 g deionized water
46.4 g a 28% strength by weight aqueous solution of Texapon® NSO
19.5 g glycidyl methacrylate
358 g styrene
247 g methyl methacrylate
26.0 g n-butyl acrylate
Feed 6:
130 g a 10% strength by weight aqueous solution of tert-butyl hydroperoxide
Feed 7:
99.2 g a 13.1% strength by weight aqueous solution of acetone bisulfite
Feed 8:
26.0 g a 10% strength by weight aqueous solution of tert-butyl hydroperoxide
Feed 9:
31.8 g a 13.1% strength by weight aqueous solution of acetone bisulfite
Feed 10:
11.7 g a 30% strength by weight aqueous hydrogen peroxide solution This gave an aqueous polymer dispersion having a pH of 3.4 and a solids content of 49.3% by weight. The viscosity of the aqueous polymer dispersion was 113 mPas. The LT value was found to be 83%.

Example 3

In a 5 l tank with anchor stirrer and nitrogen connection the initial charge was heated to 95° C. under a nitrogen atmosphere and with stirring. After it had reached the temperature, beginning simultaneously, feed 1 was metered in at a uniform rate over the course of 1.5 hours, feed 2 over the course of 1.75 hours, and feed 3 over the course of 1.25 hours, followed by a further 0.5 hour of polymerization. Subsequently the temperature was lowered to 85° C., and then feed 4 was metered in at a uniform rate over the course of 0.5 hour and the batch was subsequently stirred for a further 0.5 hour at the aforementioned temperature. The polyacrylic acid thus prepared had a weight average molecular weight Mw of 15 300 g/mol.

The aforementioned aqueous polyacrylic acid solution was admixed with 9.5 g of feed 5 over the course of 2 minutes and with 11.9 g of feed 6 over the course of 1 minute, after which 5 minutes were allowed to elapse. Thereafter, beginning simultaneously, the remainders of feeds 5 and 6 were metered in at a uniform rate over the course of 2.75 hours. After the end of feeds 5 and 6, polymerization was continued for 45 minutes. Thereafter feed 7 was added in one portion. Subsequently the batch was cooled to room temperature and the aqueous polymer dispersion obtained was filtered through a 125 μm mesh.

Initial Charge:
459 g demineralized water
Feed 1:
260 g demineralized water
675 g acrylic acid
Feed 2:
220 g demineralized water
16.2 g sodium persulfate
Feed 3:
70.9 g demineralized water
47.3 g sodium hydrogen sulfite
Feed 4:
9.0 g a 30% strength by weight aqueous hydrogen peroxide solution
Feed 5:
208 g demineralized water
60.3 g a 28% strength by weight aqueous solution of Texapon® NSO
7.5 g a 45% strength by weight aqueous solution of Dowfax® 2A1
20.3 g glycidyl methacrylate
371 g styrene
257 g methyl methacrylate
27.0 g n-butyl acrylate
Feed 6:
179 g demineralized water
13.5 g sodium persulfate
Feed 7:
56.5 g a 50% strength by weight aqueous solution of sodium hydroxide This gave an aqueous polymer dispersion having a pH of 3.2 and a solids content of 49.4% by weight. The viscosity of the aqueous polymer dispersion was 235 mPas. The LT value was found to be 65%.

Comparative Example 1

Comparative example 1 was carried out as for example 1 except that, instead of 59.5 g of a 50% strength by weight aqueous solution of hypophosphorous acid, 29.8 g of tert-dodecyl mercaptan were used.

The experiment had to be terminated, since during the metering of feed 1 the batch underwent coagulation to give a highly viscous reaction mixture.

Comparative Example 2

Comparative example 2 was carried out as for example 2 except that, instead of 2-mercaptoethanol, tert-dodecyl mercaptan was used and was admixed to feed 1 together with the water quantity of feed 3.

After the end of feed 2, a highly viscous and nonhomogeneous polymerization mixture was obtained. The experiment had to be terminated.

Comparative Example 3

Comparative example 3 was carried out as for example 3 except that, instead of sodium hydrogen sulfite, carbon tetrachloride was used and was admixed to feed 1 together with the water quantity of feed 3.

After the end of feed 2, a highly viscous and nonhomogeneous polymerization mixture was obtained. The experiment had to be terminated.

Performance Testing

Testing took place by the test method for concrete plasticizers which is explained in more detail below and is based on EN 196 or DIN 18555 Part 2.

Apparatus:

mixer type 203 (from Testing Bluhm and Feuerhard GmbH)

stopwatch laboratory balance (accuracy +/−1 g)

flow table d=300 mm (from Testing Bluhm and Feuerhard GmbH)

slump cone dropping funnel with hose connection spoon vibrating table type 2.0233 (from Testing Bluhm and Feuerhard GmbH)

Materials:

cement:aggregate=1:3; grading curve 0/2

1000 g of CEN I, CEN II and CEN III standard sand;

1000 g of Heidelberg cement CEM I 42.5 R (Wetzlar works);

440 g of water: this gives a quotient of amount of water to amount of cement (w/c) of 0.44.

Aqueous polymer dispersion as plasticizer: the amount of plasticizer is indicated as the solid substance, based on the cement fraction. The amount of water added by virtue of the aqueous polymer dispersion is taken into account when calculating the total amount of water for setting the w/c value.

Test Procedure:

a) Preparing the Mortar

The total amount of the dry mix (cement+sand) is mixed homogeneously at about 23° C. for one minute using a mortar mixer according to DIN EN 196. The wet component (i.e., aqueous polymer composition of example 1 and the resulting amount of water) is then metered in continuously by means of a dropping funnel over a period of approximately 15 seconds. After one minute of subsequent stirring, the preparation of the mortar is complete. For the purpose of comparison, a mortar was prepared without aqueous polymer composition.

b) Slump Test According to DIN 18555 Part 2

To determine the slump, the slump cone is placed centrally onto the glass disk of the flow table and the mortar is introduced in three layers, with each layer being compacted by pressing with the spoon. During the introduction of the mortar, the slump cone is pressed with one hand onto the glass plate. The projecting mortar is scraped off and the free surface of the flow table is cleaned if appropriate. Subsequently the slump cone is cooled vertically upward, slowly, and the mortar is spread on the glass plate with 15 reciprocating strokes. The diameter of the slumped mortar is then measured in two directions at right angles to one another. The result is reported in cm as the arithmetic mean of the two measurements. The determination is made 5, 30, 60, and 90 minutes after the addition of the wet component. Prior to each measurement, the mortar is briefly stirred up by hand. The results obtained are listed in Table 1.

TABLE 1

Results of performance testing

| Polymer dispersion | Amount [% by weight] | Slump [cm] after | | | |
|---|---|---|---|---|---|
| | | 5 min. | 30 min. | 60 min. | 90 min. |
| Comparative | — | 20.9 | 16.8 | 15.4 | 14.7 |
| Example 1 | 0.4 | 22.8 | 21.4 | 20.1 | 17.9 |

From the results it is clearly evident that the aqueous polymer composition according to the invention, from example 1, produces a greater slump than the unadditized mortar.

The invention claimed is:

1. A process for preparing an aqueous polymer composition by the free radically initiated emulsion polymerization of a monomer mixture M comprising
   i) from 0.01 to 10% by weight of at least one ethylenically unsaturated monomer M1 which comprises at least one epoxide group and/or at least one hydroxyalkyl group, and
   ii) from 90 to 99.99% by weight of at least one additional ethylenically unsaturated monomer M2 which differs from the monomers M1,
   in an aqueous medium in the presence of a polymer A comprising
   a) from 80 to 100% by weight of at least one ethylenically unsaturated mono- and/or dicarboxylic acid monomer A1 and
   b) from 0 to 20% by weight of at least one additional ethylenically unsaturated monomer A2 which differs from the monomers A1, incorporated in the form of polymerized units, and
   the ratio of the total amount of the monomer mixture M to the total amount of the polymer A being from 1:99 to 99:1, wherein the polymer A has been prepared in an aqueous medium by the free radically initiated polymerization of the monomers A1 and A2 in the presence of a sulfur-, nitrogen-, and/or phosphorus-containing free radical chain regulator which at 20° C. and 1 atm in demineralized water has a solubility of $\geq 5$ g/100 g of water.

2. The process according to claim 1, wherein the solubility of the free radical chain regulator is $\geq 10$ g/100 g of water.

3. The process according to claim 1, wherein the free radical chain regulator is selected from the group consisting of hypophosphorous acid and the alkali metal salts thereof, alkali metal hydrogen sulfite, hydroxylammonium sulfate, 2-mercaptoethanol and mixtures thereof.

4. The process according to claim 1, wherein the amount of the free radical chain regulator is selected so that the weight average molecular weight of the polymer A is $\geq 1000$ g/mol and $\leq 20,000$ g/mol.

5. The process according to claim 1, wherein the amount of the free radical chain regulator is selected so that the weight average molecular weight of the polymer A is $\geq 2000$ g/mol and $\leq 15,000$ g/mol.

6. The process according to claim 1, wherein exclusively acrylic acid is used as monomer A1.

7. The process according to claim 1, wherein the at least one monomer M1 is selected from glycidyl acrylate, glycidyl methacrylate, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate and mixtures thereof.

8. The process according to claim 1, wherein the monomers M1 and M2 of the monomer mixture M are selected so that the polymer obtained by the polymerization of the monomer mixture M has a glass transition temperature of $\geq -20°$ C. and $\leq 105°$ C.

9. An aqueous polymer composition obtained by the process according to claim 1.

10. A binder comprising the aqueous polymer composition according to claim 9.

11. The process according to claim 1, wherein monomer M1 comprises at least one of glycidyl acrylate and glycidyl methacrylate.

12. The process according to claim 1, wherein monomer M1 comprises glycidyl methacrylate.

13. The process according to claim 1, wherein monomers M2 comprise:
   from 50 to 99.9% by weight of esters of acrylic and/or methacrylic acid with alkanols having 1 to 12 carbon atoms, or
   from 50 to 99.9% by weight of styrene and/or butadiene, or
   from 50 to 99.9% by weight of vinyl chloride and/or vinylidene chloride, or
   from 40 to 99.9% by weight of vinyl acetate, vinyl propionate and/or ethylene.

14. The process according to claim 1, wherein monomers M2 comprise:
   from 0.1 to 5% by weight of at least one α,β-monoethylenically unsaturated mono-and/or dicarboxylic acid having 3 to 6 carbon atoms and/or the amide thereof, and from 50 to 99.9% by weight of at least one ester of acrylic and/or methacrylic acid with alkanols having 1 to 12 carbon atoms, or
   from 0.1 to 5% by weight of at least one α,β-monoethylenically unsaturated mono- and/or dicarboxylic acid having 3 to 6 carbon atoms and/or the amide thereof, and from 50 to 99.9% by weight of styrene and/or butadiene, or
   from 0.1 to 5% by weight of at least one α,β-monoethylenically unsaturated mono- and/or dicarboxylic acid having 3 to 6 carbon atoms and/or the amide thereof, and from 50 to 99.9% by weight of vinyl chloride and/or vinylidene chloride, or
   from 0.1 to 5% by weight of at least one α,β-monoethylenically unsaturated mono- and/or dicarboxylic acid having 3 to 6 carbon atoms and/or the amide thereof, and from 40 to 99.9% by weight of vinyl acetate, vinyl propionate and/or ethylene.

15. The process according to claim 1, wherein the amount of monomers M1 is from 0.5% to 3% by weight, and the amount of monomers M2 is from 97 to 99.5% by weight, based on the total amount of monomer mixture M.

16. The process according to claim 1, wherein the ratio of the total amount of monomer mixture M to the total amount of the polymer A is from 10:90 to 90:10.

17. The process according to claim 1, wherein the ratio of the total amount of monomer mixture M to the total amount of the polymer A is from 20:80 to 80:20.

18. The process according to claim 1, wherein the ratio of the total amount of monomer mixture M to the total amount of the polymer A is from 40:60 to 60:40.

* * * * *